United States Patent [19]

Asakawa et al.

[11] Patent Number: 4,718,095
[45] Date of Patent: Jan. 5, 1988

[54] SPEECH RECOGNITION METHOD

[75] Inventors: Yoshiaki Asakawa, Kawasaki; Akio Komatsu, Kodaira; Nobuo Hataoka, Hachioji; Akira Ichikawa, Musashino; Kiyoshi Nagasawa, Yokohama, all of Japan

[73] Assignee: Hitachi, Ltd., Tokyo, Japan

[21] Appl. No.: 554,960

[22] Filed: Nov. 25, 1983

[30] Foreign Application Priority Data

Nov. 26, 1982 [JP] Japan ............................ 57-206149

[51] Int. Cl.⁴ .............................................. G10L 5/00
[52] U.S. Cl. ...................................................... 381/43
[58] Field of Search ...................... 381/36–50; 382/34, 35, 36; 364/513.5, 513

[56] References Cited

U.S. PATENT DOCUMENTS

| | | | |
|---|---|---|---|
| 3,816,722 | 6/1974 | Sakoe et al. | 235/152 |
| 4,038,503 | 7/1977 | Moshier | 381/43 |
| 4,059,725 | 11/1977 | Sakoe | 381/43 |
| 4,301,329 | 11/1981 | Taguchi | 381/37 |
| 4,446,531 | 5/1984 | Tanaka | 364/728 |
| 4,475,167 | 10/1984 | Chen | 364/757 |
| 4,559,604 | 12/1985 | Ichikawa et al. | 381/43 |
| 4,592,085 | 5/1986 | Watari et al. | 381/43 |

FOREIGN PATENT DOCUMENTS 84303870 12/1984 European Pat. Off. .

OTHER PUBLICATIONS

An Isolated Word Recognition Method Using Power Weighted Spectral Matching Measure, Aikawa et al., Dec. 22, 1981, at Musashino E.C.L., N.it. pp. 469-475.

Primary Examiner—Emanuel S. Kemeny
Attorney, Agent, or Firm—Antonelli, Terry & Wands

[57] ABSTRACT

A speech recognition method makes it possible to improve the accuracy of recognition of input speech and is capable of operating on a real time basis. This is accomplished by generating from the input speech signal a difference signal which indicates whether the speech power of the input speech is increasing or decreasing for each frame. The similarity between the input speech and a standard pattern is then calculated for each frame, and this is then followed by correcting the similarity calculation on the basis of the generated difference signal and a difference signal relating to the standard pattern obtained from storage. The matching of the input speech and the standard pattern is then effected by using the corrected similarity, and the input speech is then recognized from the result of this matching. Thus, a spectrum matching distance weighted by power information of speech can be obtained in real time.

8 Claims, 7 Drawing Figures

SPEECH RECOGNITION METHOD

BACKGROUND OF THE INVENTION

The present invention relates to a speech recognition method utilizing the pattern matching method.

In the speech recognition method according to the pattern matching method, the speech information is generally recognized by matching the information of a spectrum obtained from input speech with standard patterns. On the other hand, it has been attempted to positively adopt the information of speech power to improve the recognition accuracy. Recently, a satisfactory result has been reported on a speech recognition of speech patterns made by unspecified talkers (Aikawa, K, et. al.: An Isolated Word Recognition Method Using Power-Weighted Spectral Matching Measure; Transactions of the Committee on Speech Research, Acoust. Soc. Jpn., S81-59 (1981)).

A problem encountered when information of speech power is used to recognize a speech pattern is the difficulty in comparing speech power by use of the absolute values thereof. To solve this problem, it is proposed to normalize the speech power by using the maximum and minimum values of the speech power in the input speech interval, which is also utilized in the method discribed in the above-mentioned report. In this case, relevant processing cannot be initiated until the end of the speech interval because the maximum and minimum values of speech power are needed, that is, the processing cannot be started is principle at the same time when a speech pattern in inputted. This causes the output of the processed recognition results to be delayed, and furthermore, a buffer memory is necessary to store information to be outputted afterward; thus, the size and cost of the speech recognition equipment will be increased.

On the other hand, a pattern matching method according to the dynamic programming (to be abreviated as DP hereinafter) method has been proposed. Especially, a continuous DP matching method has been disclosed as a realtime matching method suitable for continuous speech. (Refer to the Japan Patent Laid-open No. 55-2205 for details.) This method has a feature that the results obtained by matching the input speech with the relevant standard pattern are continuously outputted. However, since the matching results reflect only the evaluation of the average degree of similarity between the input speech and the standard patterns, a problem that the error of recognition therebetween is increased in principle arises for input words including a similar portion. To overcome this difficulty, the inventors of the present invention have proposed a method in which each of the standard patterns is subdivided into a plurality of partial standard patterns and each of these partial standard patterns is compared independently. (See for example, Japan Patent Laid-open No. 58-58598 dated Apr. 7, 1983, only for reference). According to this method, if an input speech is matched with standard patterns and partial patterns thereof under a predetermined condition, the input speech is assumed to fall into the same category as the standard pattern. In this method, however, since each of the standard patterns is matched independently of the partial standard patterns thereof, the standard pattern memory and the load imposed on the matching block are increased.

SUMMARY OF THE INVENTION

An object of the present invention is to provide a speech recognition method which makes it possible to improve the recognition accuracy by use of the information of speech power without deteriorating the real time speech recognition operation.

Another object of the present invention is to provide a speech recognition method which makes it possible to implement a highly accurate recognition performance even for similar input speech patterns.

The present invention is characterized in that the degree of similarity is determined as a speech pattern is inputted by using information of the difference between speech power of the input speech, that is, whether the speech power is increasing or decreasing; thereby realizing real time speech recognition processing.

Furthermore, at least one pattern (partial standard pattern to be referred to simply a partial pattern) is specified beforehand for the pattern to be used as the standard (standard pattern) in the present invention. As a speech input takes place, the degree of matching between the input speech and the partial patterns of the standard pattern is simultaneously calculated in synchronism with the calculation of the degree of matching between the input speech and the standard pattern. These calculation results are comprehensively evaluated to reduce the error in recognizing similar speech inputs, thereby improving the speech recognition ratio.

DESCRIPTION OF THE PREFERRED EMBODIMENTS

Figure 1:
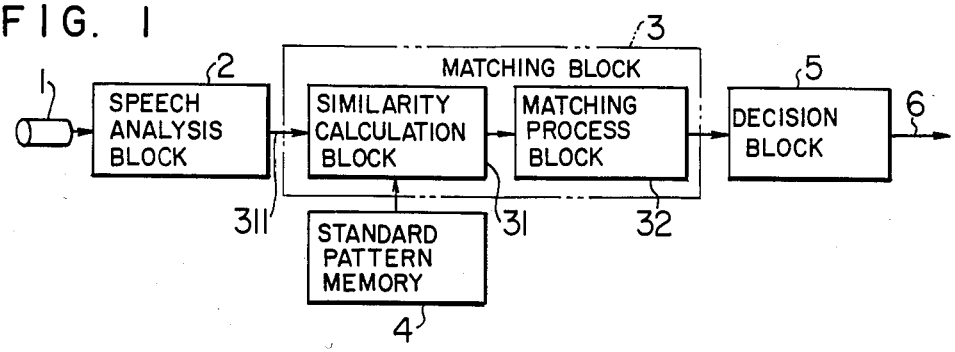
FIG. 1 is a block diagram of an embodiment of a speech recognition system according to the present invention.

The present invention will be explained in detail according to the following embodiments. FIG. 1 is a block diagram of an embodiment of a speech recognition system according to the present invention, In this embodiment, the calculation of the degree of similarity between an input speech and each standard pattern is initiated before the end of the input speech interval by use of information as to the difference in the speech power of the sequential input speech, that is, the information indicating whether the speech power is increasing or decreasing. Then the matching operation between the input speech and each standard pattern is performed on the basis of the obtained degree of similarity, thereby realizing realtime speech recognition processing.

In FIG. 1, the input speech is inputted from a microphone 1. In some cases, a telephone set or the like is utilized in place of a microphone. The feature of input speech is analyzed in the speech analysis block 2 to obtain a time series of feature parameters.

Various frequency analysis methods have been widely utilized to analyze speech features, for example, the analysis by band pass filters, zero crossing analysis, Fourier transformation, correlation analysis, Cepstrum analysis, analysis by synthesis, and linear predictive coding (LPC). Although various parameters are used in these frequency analysis methods, it should be appreciated that the types of parameters to be used for speech recognition are not essential to the present invention. For the explanation of the present invention, it is assumed that the input speech is analyzed according to the LPC method by using the autocorrelation coefficient and the normalized residual power of degree 10 as the measure of the similarity degree.

An autocorrelation coefficient of degree 10 is obtained as follows from the speech analysis block 2 for each analysis frame period (typically, 10 ms):

$$V_t = (V_{0t}, V_{1t}, \ldots, V_{10t}) \tag{1}$$

where t is an analysis frame number corresponding to time. A matching block 3 comprises a similarity calculation block 31 for calculating the degree of similarity with respect to the feature parameters between frames of the input speech and the standard pattern stored in a standard pattern memory 4 (to be explained by use of the normalized residual power as an example in this embodiment) and a matching process block 32. According to the present embodiment, each of a plurality of standard patterns e.g. ten patterns is represented by a time series of inverse spectrum parameters as follows:

$$A_\tau = (A_{0\tau}, A_{1\tau}, \ldots, A_{10\tau}) \tag{2}$$

where $\tau$ indicates the analysis frame number of a standard pattern. The following formula is used to calculate a normalized residual power $\gamma$ as the degree of similarity between the frames of the input speech and standard pattern:

$$\gamma = \left( v_0 A_0 + 2 \sum_{i=1}^{10} v_i A_i \right) / \gamma_o \tag{3}$$

where $\gamma_o$ is the residual power of input speech frame.

In the matching process block 32, the similarity matrix (normalized residual power matrix) obtained from a similarity calculation block 31 is referenced to perform a nonlinear time warping matching based on the dynamic programming (DP) method, thereby obtaining the matching degree. In a decision block 5, the matching degree with respect to each standard pattern is compared to determine the most satisfactory matching degree and a recognition result 6 is outputted.

Figure 2:
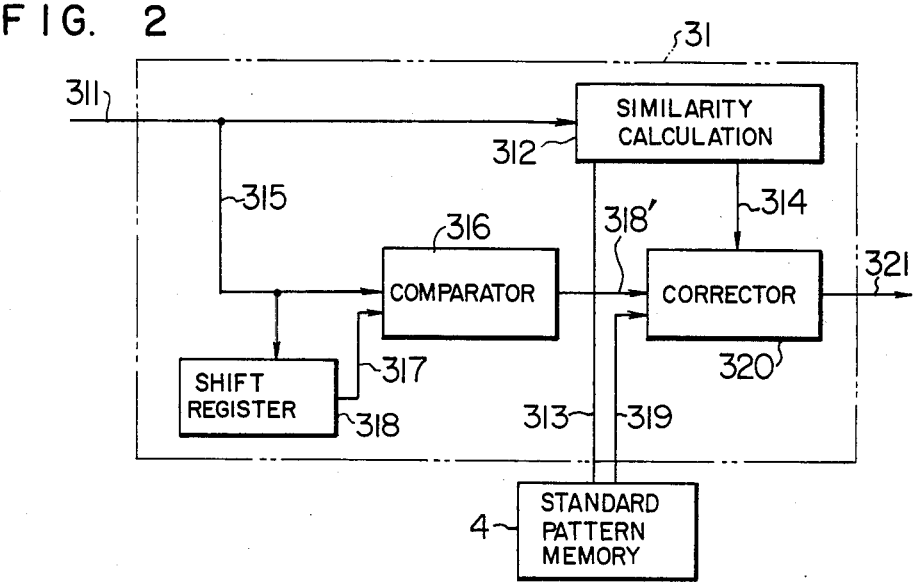
FIG. 2 illustrates a detailed block diagram of the similarity calculation block depicted in the block diagram of FIG. 1.

FIG. 2 is a block diagram illustrating in detail the similarity calculation block 31 shown in FIG. 1. A feature parameter 311 outputted for each analysis frame period of input speech is inputted to a similarity calculation means 312 which has been commonly used in the conventional method, then an ordinary similarity degree ($\gamma$) 314 is calculated from the formula (3) by using the inputted feature parameters 311 and the inverse spectrum parameters 313 obtained from the standard pattern memory 4. At the same time, an input speech power ($V_{0t}$) 315 which is a portion of the feature parameters of the input speech is inputted to a comparator 316. Another input 317 to the comparator 316 is an input speech power ($V_{0t-1}$) of the previous analysis frame, which can be easily produced from the input speech power ($V_{0t}$) 315 by means of a shift register 318. An output 318' from the comparator 316 is information as to the difference in the input speech power ($V_{0t}$) 315 and is inputted to a correction circuit 320 together with difference information 319 of the speech power of the standard patterns, the difference information 319 being calculated and stored in the standard pattern memory 4 in advance. In the correction circuit 320, each difference information between the input speech and standard pattern is referenced and the similarity degree ($\gamma$) 314 is corrected to be a new similarity degree ($\gamma'$) 321.

There are various methods for correcting the similarity degree $\gamma$, for example, a multiplication type method and addition type method. A typical example of a multiplication type correction method will be explained. According to the multiplication type correction method, the new similarity degree $\gamma'$ is obtained from the following expression:

$$\gamma' = \gamma \times \alpha \tag{4}$$

where $\alpha$ is a kind of weight to be determined by a combination of the speech power difference information of the input speech and the standard pattern. It will be assumed that a mark $\oplus$ is indicated if the speech power is increasing for the pertinent frame and that a mark $\ominus$ is indicated if it is decreasing. (A mark $\phi$ is indicated if the speech power does not change.) As an example, the weight $\alpha$ is determined according to a combination of the input speech and the standard pattern as depicted in Table 1.

TABLE 1

| Standard pattern | Input speech | | |
|---|---|---|---|
| | $\oplus$ | $\ominus$ | $\phi$ |
| $\oplus$ | 1.0 | 1.2 | 1.0 |
| $\ominus$ | 1.2 | 1.0 | 1.0 |
| $\phi$ | 1.0 | 1.0 | 1.0 |

As the value of normalized residual power decreases, the the degree of similarity becomes higher. (The minimum value is 1.0 which indicates the degree of similarity obtained by matching the same pattern.) Consequently, if a frame in which the input speech power is increasing (or decreasing) is combined with a frame in which the speech power of standard pattern is decreasing (or increasing), the normalized residual power is equivalent to the similarity degree $\gamma$ to which a penalty is added. That is, the spectrum information is weighted since the similarity degree $\gamma$ indicates the similarity between spectrum information.

Although various modifications are possible for the correction circuit 320, it is apparant that the correction circuit 320 can be implemented by use of simple circuits. A higher flexibility can be provided for the correction circuit 320 by adopting a general-purpose microcomputer or the like.

The control block for controlling various timing is not illustrated in FIG. 2, but it should be appreciated that the circuitry can be realized by use of simple circuits. Moreover, the equivalent functions can be apparently implemented by means of the program control based on a general-purpose microcomputer.

According to the present embodiment, it is not necessary to detect the maximum and minimum values of speech power to normalize the speech power, thus a spectrum matching distance weighted by the speech power can be obtained in real-time before the end of input speech is detected, which makes it possible to effectively utilize the speech power information having an invariant characteristic for various talkers, thereby contributing to the improvement of recognition ratio for recognizing speech made by unspecified talkers. In the experiments effected on ten numeric characters pronounced by 50 talkers by adopting the method according to the present invention, more than 30% of the erroneous recognition has been improved.

Next, an embodiment will be explained in which the recognition ratio is further improved by utilizing partial patterns in the processing for matching the input speech and the standard patterns. In this method, at least one partial pattern is beforehand specified for each standard pattern, and the matching degree with respect to the partial patterns is calculated simultaneously in synchronism with the calculation of matching degree with respect to the standard pattern. It is a characteristic of the present invention to improve the recognition ratio by reducing the recognition error for similar speech based on the conprehensive evaluation of the results obtained from the above-mentioned calculations.

Figure 3:
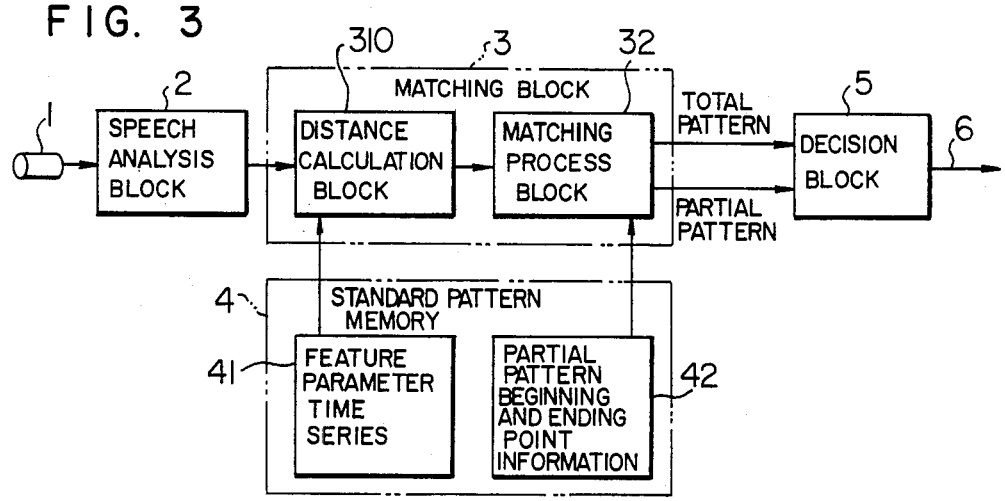
FIG. 3 shows a block diagram of another embodiment of the speech recognition system according to the present invention.

FIG. 3 depicts a block diagram of another embodiment of a speech recognition system according to the present invention. In this configuration, output values of band pass filters are adopted as the feature parameters of speech analysis and the distance is utilized as the measure of the degree of similarity.

In FIG. 3, the input speech inputted from the microphone 1 is converted into a feature parameter in the speech analysis block 2. In an example in which the speech analysis block 2 comprises an n-channel filter bank, the number of filter output values obtained as follows for each analysis frame period (for example, 10 ms) is n:

$$x_t = (x_{1t}, x_{2t}, \ldots, x_{nt}) \tag{1}'$$

where t indicates an analysis frame number corresponding to time.

The matching block 3 comprises a distance calculation block 310 and the matching process block 32. In the distance calculation block 310, the distances between the feature parameters of said input speech and the standard patterns are calculated. The standard patterns are stored in the standard pattern memory 4 in the form of a time series of feature parameter 41 as follows:

$$Y_\tau = (Y_{1\tau}, Y_{2\tau}, \ldots, Y_{n\tau}) \tag{2}'$$

where, $\tau$ is the analysis frame number of a standard pattern. In this case, it is assumed to calculate the Euclidean distance as the measure of the degree of similarity. Then, the following distance matrix is obtained:

$$d(t, \tau) = \left( \sum_{i=1}^{n} (x_{it} - y_{i\tau})^2 \right)^{\frac{1}{2}} \tag{3}'$$

This indicates that the degree of similarity becomes higher as the value of distance d decreases. It is also naturally possible to weight the distance d according to the speech power like the first embodiment. Although the relevant processing is omitted in FIG. 3, the distance d in the following explanations is assumed to have been weighted according to the speech power. In the matching process block 32, the above-mentioned distance matrix is referenced to perform a nonlinear time warping matching by use of the DP method. In this case, information of the beginning and ending points 42 of partial patterns stored in the standard pattern memory is referenced to calculate the matching degree with respect to partial patterns in synchronism with the calculation of the degree of matching with respect to the standard patterns.

The matching degrees obtained with respect to the standard patterns and partial patterns are delivered to the decision block 5, which then outputs the recognition result 6.

An arithmetic processing in the matching process block 32 will be as follows in an example in which the time alignment is carried out based on the continuous DP method.

Figure 4:
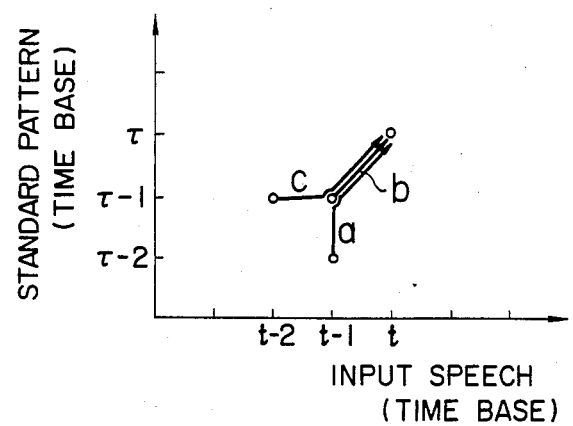
FIG. 4 depicts an example of the dynamic programming time alignment.

The distance D between the input speech and the standard pattern is represented as follows:

$$D(t, \tau) = 2d(t, \tau) + \min$$

$$\begin{cases} D(t-1, \tau-2) + d(t-1, \tau-1) & (a) \\ D(t-1, \tau-1) & (b) \\ D(t-2, \tau-1) + d(t-1, \tau-1) & (c) \end{cases} \tag{5}$$

where min indicates that the minumum value is selected from (a), (b), and (c). A pass a, b, or c depicted in FIG. 4 is selected corresponding to the selected value (a), (b), or (c). Assuming that a register C is used for the difference between passes as compared with the case when the pass b is selected (that is, the time extension or shrinkage does not take place), C(t, $\tau$) is expressed in accordance with (a),(b) and (c) of formula (5) as follows:

$$C(t, \tau) = \begin{cases} C(t-1, \tau-2) - 1 & \text{if } (a) \\ C(t-1, \tau-1) & \text{if } (b) \\ C(t-2, \tau-1) + 1 & \text{if } (c) \end{cases} \tag{6}$$

If the length of the standard pattern is S frames, the length L(t) of the pass to the frame t of input speech is represented as:

$$L(t) = 2S + C(t, s) \tag{7}$$

The matching degree M in the frame t is expressed as follows:

$$M(t) = D(t,s)/L(t) \tag{8}$$

Figure 5:
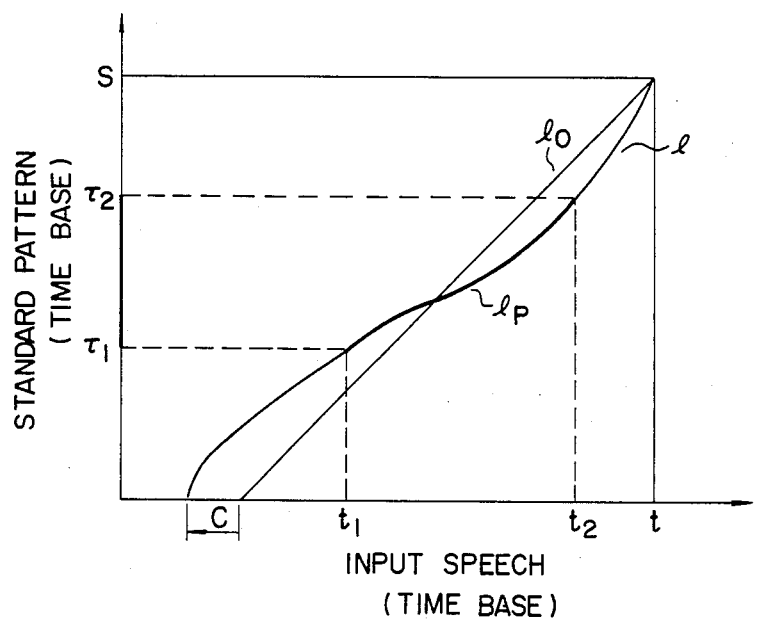
FIG. 5 is a graph illustrating a standard pattern and the matching with partial patterns thereof.

Next, a calculation for obtaining the matching degree with respect to partial patterns will be described. Although one or more partial patterns can be specified for a standard pattern, only one partial pattern is used here to simplify the explanation in which the beginning and ending points are expressed as $\tau_1$ and $\tau_2$ ($1 \leq \tau_1 \leq \tau_2 \leq S$). FIG. 5 shows the relationship between the standard pattern and the input speech. Letter l indicates a pass selected for the frame t of input speech and $l_p$ is a partial pass corresponding to the partial pattern ($\tau_1 \leq \tau \leq \tau_2$). The matching degree $M_p$ on $l_p$ is obtained for the frame t of input speech as follows.

Assuming that the cumulative value of distance on $l_p$ is $D_p$ and the number of distance values to be accumulated in $N_p$:

(i) For $\tau < \tau_1$;
$$D_p(t, \tau) = 0 \quad (9)$$
$$N_p(t, \tau) = 0 \quad (10)$$

(ii) For $\tau_1 \leq \tau \leq \tau_2$;
$$D_p(t, \tau) = d(t, \tau) +$$

$$\begin{cases} D_p(t-1, \tau-2) + d(t-1, \tau-1) & \text{if } (a) \\ D_p(t-1, \tau-1) & \text{if } (b) \\ D_p(t-2, \tau-1) + d(t-1, \tau-1) & \text{if } (c) \end{cases} \quad (11)$$

$$N_p(t, \tau) = \begin{cases} N_p(t-1, \tau-2) + 2 & \text{if } (a) \\ N_p(t-1, \tau-1) + 1 & \text{if } (b) \\ N_p(t-2, \tau-1) + 2 & \text{if } (c) \end{cases} \quad (12)$$

(iii) For $\tau_2 < \tau$;

$$D_p(t, \tau) = \begin{cases} D_p(t-1, \tau-2) & \text{if } (a) \\ D_p(t-1, \tau-1) & \text{if } (b) \\ D_p(t-2, \tau-1) & \text{if } (c) \end{cases} \quad (13)$$

$$N_p(t, \tau) = \begin{cases} N_p(t-1, \tau-2) & \text{if } (a) \\ N_p(t-1, \tau-1) & \text{if } (b) \\ N_p(t-2, \tau-1) & \text{if } (c) \end{cases} \quad (14)$$

To obtain the matching degree $M_p$ of partial pattern for the frame t of input speech:

$$M_p(t) = D_p(t,s)/N_p(t,s) \quad (15)$$

and frames $t_1$ and $t_2$ corresponding to the beginning and ending points $\tau_1$ and $\tau_2$ of partial pattern (see FIG. 5 for details), it is necessary only to perform calculations similar to formula (6) and to utilize the resultant information. (In FIG. 5, $l_0$ indicates a pass to be selected when the extension or shrinkage of time base does not take place.) For the calculations of above-listed formulas (5)–(15), it is necessary only to hold information concerning two frames up to the second last frame and the real-time processing is possible by use of a shift register and a comparator. It need not be described that the real-time processing can be implemented by using a general-purpose microprocessor.

Figure 6:
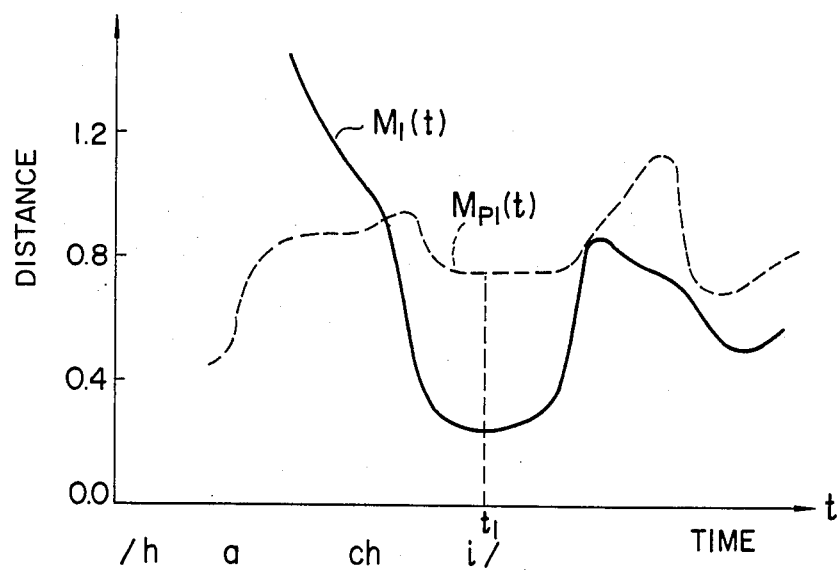
FIGS. 6 and 7 illustrate the matching degree of an input speech with respect to the standard patterns and that of input speech with respect to the partial patterns, respectively.
Figure 7:
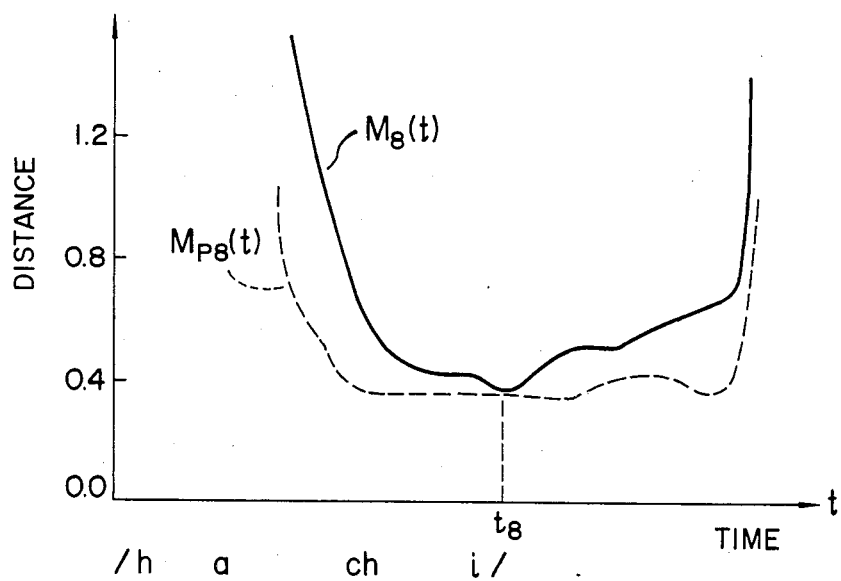

Next, a concrete example will be explained in which Japanese numeric characters are recognized according to the present embodiment. FIG. 6 depicts the matching degrees $M_1$ (t) and $M_{p1}$ (t) of the portion of /hachi/ in a continuous speech with respect to a standard pattern /ichi/ and its partial pattern (/i/ in the first syllable is specified). FIG. 7 shows the matching degree $M_8$ (t) and $M_{ps}$ (t) of the same input speech with respect to the standard pattern /hachi/ and its partial pattern (/ha/ in the first syllable is specified). When the minimal values of the matching degrees $M_1$ (t) and $M_8$ (t) with respect to the respective standard patterns are compared, it is found that the minimal value of $M_1$ (t) with respect to the standard pattern /ichi/ is smaller and the input speech is erroneously recognized to be /ichi/. This is a phenomenon which occurs because the portion of /chi/ in the input speech is quite similar to the portion of /chi/ in the standard pattern /ichi/.

The recognition performance can be stabilized by utilizing the matching degrees $M_{p1}$ (t) and $M_{p8}$ (t) with respect to the partial patterns in the decision block. Although there are various decision logics, one of the simplest example will be explained in which the matching degree with respect to the overall pattern is compared with the sum of the matching degrees with respect to the partial patterns. Subscripts 1 and 8 indicate the standard patterns ichi and hachi, respectively hereinafter. Assume that the matching degree $M_1$ (t) with respect to the standard pattern /ichi/ is minimized at time $t_1$ in FIG. 6 and that the matching degree $M_8$ (t) with respect to the standard pattern /hachi/ is minimized at time $t_8$ in FIG. 7. Since the matching degrees with respect to the standard patterns and partial patterns there are as follows in this example:

$$M_1(t_1) = 0.24, M_{p1}(t_1) = 0.74$$

$$M_8(t_8) = 0.35, M_{p8}(t_8) = 0.37$$

the following relationship is obtained.

$$M_1(t_1) + M_{p1}(t_1) + 0.98 > M_8(t_8) + M_{p8}(t_8) = 0.72$$

Consequently, the input speech is correctly recognized to be /hachi/.

In the example described above, the present invention has been explained in conjunction with a case in which Japanese numeric characters are recognized as an example of similar input speech; however, it should be appreciated that the present invention is not limited to numeric character speech recognition and that the present invention is also effective to recognize the speech made in other languages, such as English and French.

According to the present invention, the degree of similarity of a specified portion can be simultaneously evaluated together with the average degree of similarity with respect to a standard pattern, and the recognition performance can be improved without deteriorating the real-time operability of speech recognition.

What is claimed is:

1. A speech recognition method, comprising the steps of:
    inputting a speech signal;
    analyzing said input speech signal and outputting feature parameters for each of a plurality of successive analysis frame periods of the speech represented by said speech signal;
    generating information of a power difference indicating whether the speech power of said speech is increasing or decreasing for each analysis frame;
    calculating the similarity between frames of said speech and a standard pattern stored beforehand by using said feature parameters and further feature parameters obtained from said standard pattern;
    correcting said calculated similarity based on said power difference information and further power difference information of said standard pattern, which is stored beforehand; and
    matching said speech and said standard pattern by using said corrected calculated similarity and recognizing said speech from the result of said matching.

2. A speech recognition method according to claim 1 wherein said correction step comprises selecting one of a number of predetermined weights based on the result of said power difference information obtained from said generating step and said calculated similarity obtained from said caluculating step.

3. A speech recoginition method according to claim 2 wherein said correcting step comprises multiplying said selected weight by said calculated similarity obtained in said calculating step to determine the corrected calculated similarity.

4. A speech recognition method according to claim 1 wherein said feature parameters of said speech are determined utilizing autocorrelation coeffients thereof for inter-frames and sasid calculated simlarity is determined by calculating a normalized residual power from a function having variables of the auto-correlation coefficients and the standard pattern data.

5. A speech recognition method according to claim 1 wherein an ouput value from a band-pass filter is used as a feature parameter of said input speech and a distance is adopted as said degree of similarity.

6. A speech recognition method according to claim 1, wherein said calculation of the similarity between said speech and a standard pattern is performed in synchronism with calculation of the similarity between said speech and at least one partial standard pattern specified beforehand for said standard pattern with respect to a predetermined time base and said speech is determined on the basis of the total results obtained from said calculations.

7. A speech recognition method according to claim 6 wherein a nonlinear time warping matching based on a dynamic programming method is utilized as said similarity calculation.

8. A speech recognition method according to claim 6, comprising a step of determining said speech on the basis of the sums of the similarity calculations with respect to respective standard patterns and the similarity calculations with respect to respective partial standard patterns.

* * * * *